US006575199B1

(12) United States Patent
Ueda et al.

(10) Patent No.: US 6,575,199 B1
(45) Date of Patent: Jun. 10, 2003

(54) FLUID SUPPLY PIPE

(75) Inventors: Hironori Ueda, Obu (JP); Takashi Nagai, Obu (JP); Yuichi Tanabe, Obu (JP); Yoichi Nakao, Obu (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/744,240

(22) PCT Filed: Jul. 28, 1999

(86) PCT No.: PCT/JP99/04082

§ 371 (c)(1),
(2), (4) Date: Mar. 26, 2001

(87) PCT Pub. No.: WO00/06934

PCT Pub. Date: Feb. 10, 2000

(30) Foreign Application Priority Data

Jul. 29, 1998 (JP) .......................................... 10/214370
Feb. 24, 1999 (JP) .......................................... 11/047188

(51) Int. Cl.[7] .................................................. F16L 11/00
(52) U.S. Cl. ..................... 138/137; 138/141; 428/36.91
(58) Field of Search ................................ 138/120, 125, 138/137, 155, 141; 428/36.91

(56) References Cited

U.S. PATENT DOCUMENTS 5,284,184 A * 2/1994 Noone et al. ............... 138/137
5,469,892 A * 11/1995 Noone et al. ............... 138/137
5,472,746 A * 12/1995 Miyajima et al. ........... 138/137
5,524,673 A * 6/1996 Noone et al. ............... 138/137
5,996,642 A * 12/1999 Noone et al. ............... 138/137
6,170,534 B1 * 1/2001 Noone et al. ............... 138/137
6,180,197 B1 * 1/2001 Nie et al. .................... 138/137
6,257,281 B1 * 7/2001 Nie et al. .................... 138/141
6,279,615 B1 * 8/2001 Iio et al. ...................... 138/141
6,321,795 B1 * 11/2001 Noone et al. ............... 138/137

* cited by examiner

*Primary Examiner*—James Hook
(74) *Attorney, Agent, or Firm*—Dennison, Schultz & Dougherty

(57) ABSTRACT

Fuel supply pipe 43 includes a fixed fuel supply pipe 43*b* that comprises a metal, such as stainless steel, and connecting fuel supply pipes 43*a*, 43*c* that comprise a resin or similar material. The bulk resistivity of connecting fuel supply pipes 43*a*, 43*c* is chosen to be within the range from $10^7$ to $10^{11}$ Ω·cm. By doing this, the amount of electric charge that builds up in the fuel when the fuel passes through connecting fuel supply pipes 43*a*, 43*c* can be held low. Further, the electric charge that builds up on connecting fuel supply pipes 43*a*, 43*c* is not rapidly discharged. Therefore, spark discharge can be prevented from being generated on connecting fuel supply pipe 43*a*. Connecting fuel supply pipes 43*a*, 43*c* may have a multi-layer structure that includes an innermost layer having a bulk resistivity of $10^7$ to $10^{11}$ Ω·cm and an outermost layer having a bulk resistivity of about $10^{12}$ Ω·cm or more.

11 Claims, 6 Drawing Sheets

FLUID SUPPLY PIPE

FIELD OF THE INVENTION

The present invention relates to fluid supply pipes for supplying a fluid, such as a liquid or gas. In particular, the present invention relates to fluid supply pipes in which the amount of electric charge that builds up in the fluid when the fluid passes through the fluid supply pipes can be maintained within a proper range.

BACKGROUND OF THE INVENTION

Fuel supply systems have been recently developed in which a fuel pump and a fuel filter are disposed within a fuel tank that is installed in a location some distance away from an internal combustion engine of a vehicle, in which fuel is drawn out of the fuel tank by the fuel pump and is supplied to the internal combustion engine through a fuel supply pipe. FIG. 8 schematically shows a construction of an example of such a known fuel supply system. The fuel supply system shown in FIG. 8 is of a type that controls the fuel pump such that the pressure of the fuel that is supplied to a fuel injection valve is maintained at a desired pressure.

As shown in FIG. 8, an inlet pipe 20 and an exhaust pipe 30 are connected to an internal combustion engine 10, and an inlet valve 13 and an exhaust valve 14 are disposed in the engine 10. Air is filtered through an air cleaner 21 and is supplied into inlet pipe 20 via a throttle valve 22. Throttle valve 22 controls the air flow rate. Fuel is also supplied from a fuel injection valve 40 into inlet pipe 20. The air and the fuel are mixed within inlet pipe 20 and are supplied into each cylinder through inlet valve 13. Further, combustion gas within the cylinder is exhausted into exhaust pipe 30 through exhaust valve 14.

Further, fuel pump 42 (which is typically constructed in modules that are integrally formed with a fuel filter) is disposed within a fuel tank 41 and serves to draw fuel out of fuel tank 41. Fuel is supplied from fuel tank 41 to a fuel injection valve 40 for each cylinder through a fuel supply pipe 73 and a delivery pipe 45.

Fuel supply pipe 73 includes a fixed fuel supply pipe 73*b* that is fixedly attached to the vehicle body and also includes connecting fuel supply pipes 73*a*, 73*c*, which connect fixed fuel supply pipe 73*b* to fuel pump 42 and delivery pipe 45. Fixed fuel supply pipe 73*b* comprises a metal, such as a conductive stainless steel. Fixed fuel supply pipe 73*b* is normally attached to the vehicle body by an elastic insulating element, such as plastic, in order to protect the fuel supply pipe 73*b* from vibrations. Connecting fuel supply pipes 73*a*, 73*c* comprise rubber. The use of connecting fuel supply pipe 73*a* facilitates removal and attachment of fuel pump 42. Further, connecting fuel supply pipes 73*a*, 73*c*, which comprise rubber, can absorb vibrations from the vehicle body and the engine 10.

A control unit (ECU) 60 executes various instructions based on detected signals that are transmitted from a fuel pressure sensor for detecting the fuel pressure, an intake pressure sensor for detecting the intake air pressure, an intake air temperature sensor for detecting the intake air temperature, a water temperature sensor for detecting the cooling water temperature and a sensor for detecting the opening amount of the throttle valve. For example, control unit 60 executes instructions to control the opening amount of throttle valve 22 in order to control the amount of intake air, instructions to control the opening and closing of fuel injection valve 40 in order to supply fuel into the cylinder, and instructions to control fuel pump 42 in order to maintain the fuel pressure at a desired pressure.

However, connecting fuel supply pipes 73*a*, 73*c*, which are made of rubber, deteriorate with time and thus require maintenance, such as replacement. Therefore, instead of using a rubber fuel supply pipe, it may be considered to use a resin fuel supply pipe that is easy to make and does not require maintenance.

When fuel passes through a rubber or resin fuel supply pipe, the fuel flows against the fuel supply pipe. Because of friction, the fuel and the fuel supply pipe become electrically charged. When a resin fuel supply pipe is used, a larger amount of electric charge is built up by such friction. Connecting a ground wire to the fuel supply pipe can discharge electric charge built up on the fuel supply pipe. However, electric charge built up in the fuel cannot be readily discharged. Therefore, if, for example, fuel that has been charged by passing through connecting fuel supply pipe 73*a* shown in FIG. 8 then passes through fixed fuel supply pipe 73*b* made of metal, fixed fuel supply pipe 73*b* is inductively charged. Electric charge inductively built up on fixed fuel supply pipe 73*b* is discharged to the vehicle body, the operator or the like. At this time, because fixed fuel supply pipe 73*b* has a low bulk resistivity, the electric charge may be rapidly discharged and a spark discharge may be generated. If spark discharge is generated on fixed fuel supply pipe 73*b*, fixed fuel supply pipe 73*b* may deteriorate, and operations by the operator may be disturbed.

DISCLOSURE OF THE INVENTION

It is, accordingly, an object of the present invention to maintain within a proper range the amount of electric charge that builds up in the fluid when the fluid passes through a fluid supply pipe.

Another object of the invention is to maintain within a proper range the amount of electric charge that builds up in the fluid when the fluid passes through the fluid supply pipe and also to maintain within a proper range the electric discharge energy that is generated when the electric charge built up on the fluid supply pipe is discharged.

In a preferred embodiment of the invention, the bulk resistivity of the fluid supply pipe is chosen to be $10^{11}$ Ω·cm or less. By using this fluid supply pipe, the amount of electric charge that builds up in the fluid when the fluid passes through the fluid supply pipe can be maintained within a proper range.

In another preferred embodiment of the invention, the bulk resistivity of the fluid supply pipe is chosen to be within the range from $10^7$ to $10^{11}$ Ω·cm. By using this fluid supply pipe, the amount of electric charge that builds up on the fluid when the fluid passes through the fluid supply pipe can be maintained within a proper range. Also, the electric discharge energy that is generated when the electric charge built up on the fluid supply pipe is discharged can be maintained within a proper range.

In a still another preferred embodiment of the invention, the fluid supply pipe has at least two layers. The bulk resistivity of the innermost layer is chosen to be within the range from $10^7$ to $10^{11}$ Ω·cm and the bulk resistivity of the outermost layer is chosen to be $10^{12}$ Ω·cm or more. By using this fluid supply pipe, even if the fluid supply pipe is multi-layered, the amount of electric charge that builds up in the fluid when the fluid passes through the fluid supply pipe can be maintained within a proper range. Additionally, the electric discharge energy that is generated when the electric charge built up on the fluid supply pipe is discharged can be maintained within a proper range.

Further, in the preferred embodiments of the invention, the fluid supply pipe is made of a resin.

The present invention will be more apparent from the following detailed description of the best modes for performing the invention.

BEST MODES FOR PERFORMING THE INVENTION

Figure 1:
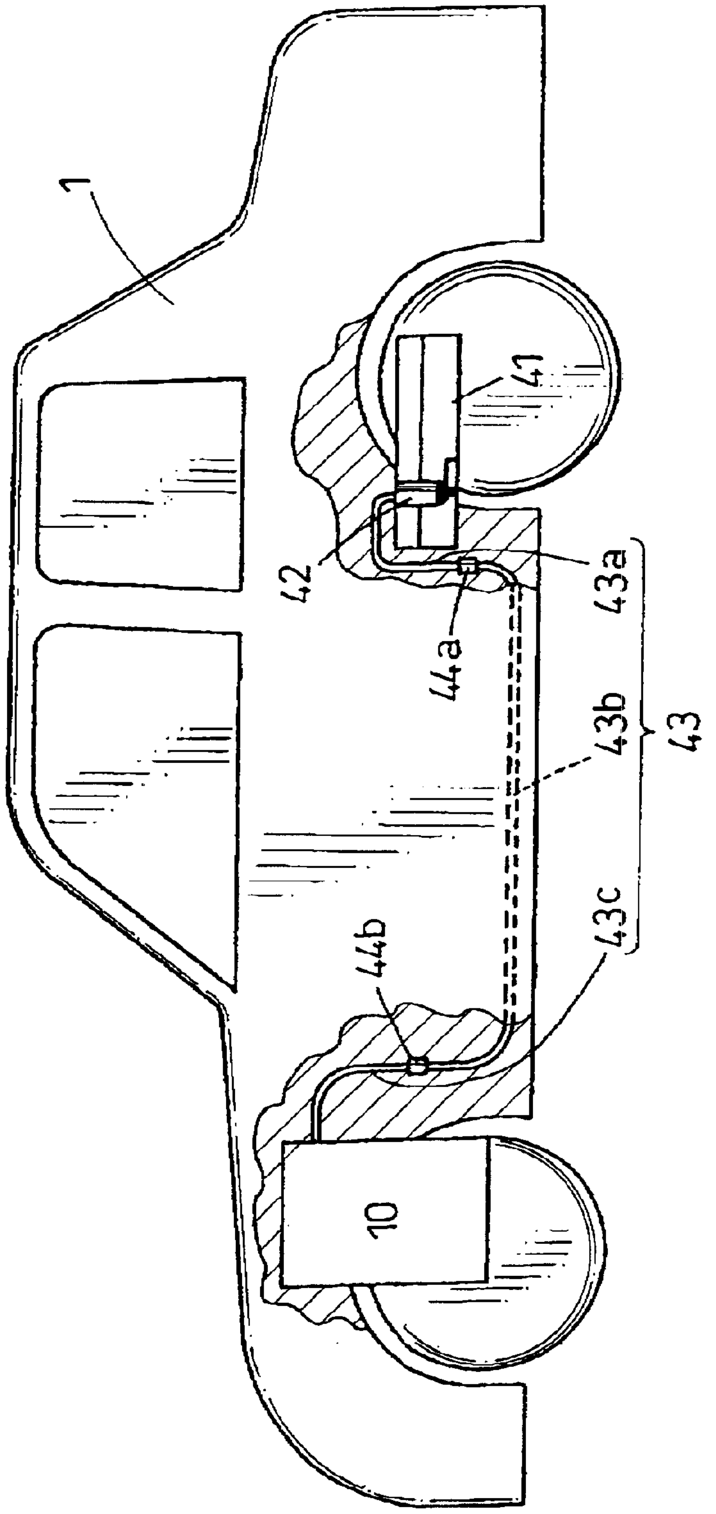
FIG. 1 is a view showing an arrangement of a fuel supply system using a fluid supply pipe according to a first embodiment of the invention.
Figure 2:
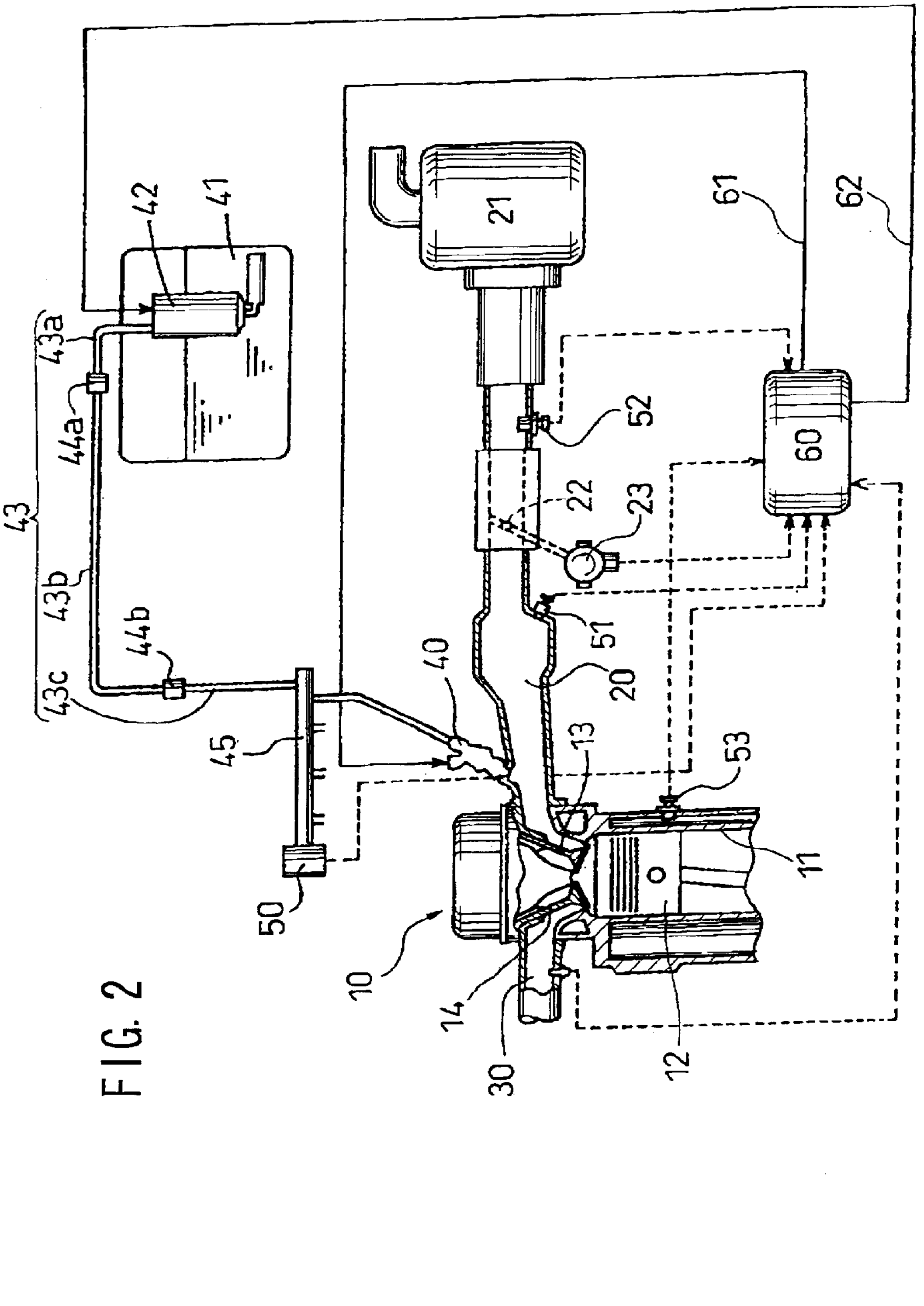
FIG. 2 is a view schematically showing a construction of the fuel supply system using the fluid supply pipe of the first embodiment.

FIGS. 1 and 2 are views showing an example of a fuel supply system using a fluid supply pipe according to a first embodiment of the invention. FIG. 1 shows an arrangement of the fuel supply system and FIG. 2 schematically shows a construction of the fuel supply system. The fuel supply system shown in FIGS. 1 and 2 is of a type that controls the fuel pump such that the pressure of the fuel that is supplied to a fuel injection valve is maintained at a desired pressure.

An internal combustion engine (fuel engine) 10 is installed in the front of a vehicle body 1 (within the engine compartment) and a fuel tank 41 is installed in the rear of the vehicle body 1 (for example, under the rear seat). A fuel pump 42 is disposed within fuel tank 41 and serves to draw fuel out of fuel tank 41. A fuel supply pipe 43 is connected to fuel tank 41 and serves to supply the fuel drawn out by fuel pump 42 to a fuel injection valve 40 and thus internal combustion engine 10 through a delivery pipe 45. Fuel pump 42 has a variable speed motor. The exhaust fuel pressure can be adjusted by controlling the variable speed motor. In this embodiment, fuel pump 42 is constructed in modules that are integrally formed with a fuel filter.

An inlet pipe 20 and an exhaust pipe 30 are connected to internal combustion engine 10, and an inlet valve 13 and an exhaust valve 14 are disposed within each cylinder 11. A piston 12 is disposed within cylinder 11. Air is filtered through an air cleaner 21 and is supplied into inlet pipe 20 via a throttle valve 22. Throttle valve 22 controls the air flow rate. Fuel is also supplied from fuel injection valve 40 into inlet pipe 20. The air and the fuel are mixed within inlet pipe 20 and are supplied into each cylinder 11 through inlet valve 13. Further, combustion gas within the cylinder 11 is exhausted into exhaust pipe 30 through exhaust valve 14. A motor 23 or similar driving means is provided to adjust the opening of throttle valve 22.

Further, various kinds of sensors are provided, such as a fuel pressure sensor 50 for detecting the fuel pressure, an intake pressure sensor 51 for detecting the intake air pressure, an intake air temperature sensor 52 for detecting the intake air temperature, a water temperature sensor 53 for detecting the cooling water temperature and a sensor for detecting the opening amount of the throttle valve 22.

A control unit (ECU) 60 executes various instructions based on detection signals that are transmitted from the sensors, such as fuel pressure sensor 50, intake pressure sensor 51, intake air temperature sensor 52, water temperature sensor 53 and the opening amount sensor. For example, control unit 60 executes instructions to control the opening amount of throttle valve 22 in order to control the amount of intake air, instructions to control the opening and closing of fuel injection valve 40 in order to supply fuel into cylinder 11, and instructions to control fuel pump 42 in order to maintain the fuel pressure at a desired pressure.

Fuel supply pipe 43 includes a fixed fuel supply pipe **43*b* and connecting fuel supply pipes 43*a*, 43*c*. Fixed fuel supply pipe 43*b* is attached to vehicle body 1. Connecting fuel supply pipes 43*a*, 43*c* connect fixed fuel supply pipe 43*b* to fuel pump 32 and delivery pipe 45. Piping connectors 44*a*, 44*b* connect fixed fuel supply pipe 43*b* to connecting fuel supply pipes 43*a*, 43*c***.

In this embodiment, fixed fuel supply pipe **43*b* comprises a metal, such as a conductive stainless steel. The length of fixed fuel supply pipe 43*b* varies depending on the size of the vehicle, but it is typically on the order of 2 to 4 meters. Fixed fuel supply pipe 43*b* is attached to vehicle body 1 by an elastic insulating element, such as a plastic, in order to protect the fuel supply pipe 43*b*** from vibrations.

Further, connecting fuel supply pipes **43*a*, 43*c* comprise a resin, and more specifically, nylon. The length of connecting fuel supply pipes 43*a*, 43*c* is typically on the order of 20 to 30 cm. By providing connecting fuel supply pipe 43*a* on the side of fuel pump 42, fuel pump 42 can be removed without removing the entire fuel supply pipe 43. Thus, fuel pump 42 can be readily removed and attached. Further, connecting fuel supply pipe 43*a* on the side of fuel pump 42 and connecting fuel supply pipe 43*c* on the side of delivery pipe 45, which comprises resin, can absorb vibrations from vehicle body 1 and engine 10. Thus, damage to connecting fuel supply pipes 43*a*, 43*c*** can be prevented.

Connecting fuel supply pipes **43*a*, 43*c*** are not limited to a resin fuel supply pipe made of nylon, but they may also be a resin fuel supply pipe made of a hard resin, such as a fluororesin, a flexible metal fuel supply pipe or a rubber fuel supply pipe.

If connecting fuel supply pipes **43*a*, 43*c* comprise rubber, connecting fuel supply pipes 43*a*, 43*c* readily expand when fuel pump 42 is driven and the fuel pressure is raised to a high pressure. As a result, a response delay will be caused when the fuel pressure is adjusted. On the other hand, if connecting fuel supply pipes 43*a*, 43*c* comprise resin, connecting fuel supply pipes 43*a*, 43*c*** do not readily expand even when the fuel pressure is raised to a high pressure. Therefore, the response delay, which will be caused when the fuel pressure is adjusted, can be reduced. Further, resin fuel supply pipes can be easily formed into various shapes.

When fuel passes through a rubber or resin fuel supply pipe, the fuel flows against the fuel supply pipe. Because of friction, the fuel and the fuel supply pipe become electrically charged. For example, if a resin fuel supply pipe is used, the fuel becomes positively charged and the fuel supply pipe becomes negatively charged.

Figure 3:
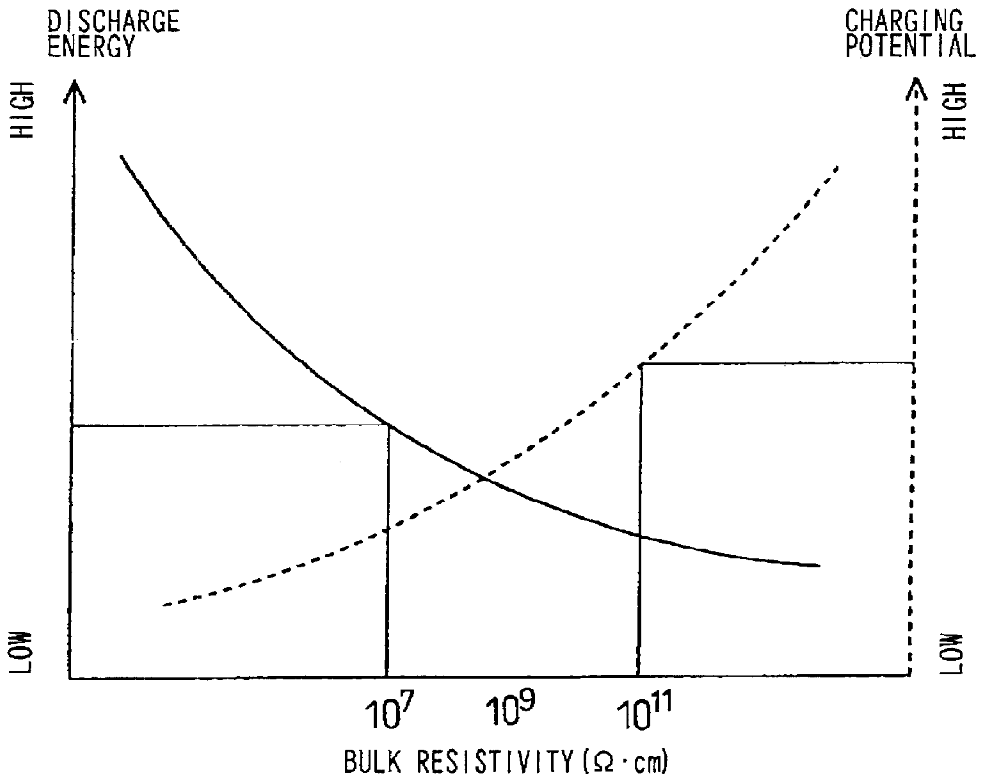
FIG. 3 is a graph showing the relation between electric discharge energy and charging potential in relation to the bulk resistivity of the fluid supply pipe.

Electric charge built up on the fuel supply pipe is discharged by metal components or similar materials that are adjacent to the fuel supply pipe. FIG. 3 is a graph showing the relation between electric discharge energy and charging potential (the amount of electric charge) in relation to the bulk resistivity of the fuel supply pipe. In FIG. 3, a solid line represents the relation between electric discharge energy and the bulk resistivity, and a broken line represents the relation between charging potential and the bulk resistivity. Electric discharge energy means energy that is generated when a predetermined amount of electric charge built up on the fuel supply pipe is discharged. Further, charging potential means electric potential that is generated by electrification of the fuel and the fuel supply pipe when fuel passes through the fuel supply pipe. The charging potential is the amount of electric charge built up on the fuel and the fuel supply pipe.

As shown in FIG. 3, as the bulk resistivity of the fuel supply pipe decreases, discharge energy, which is generated when the electric charge built up on the fuel supply pipe is discharged, increases. The discharge energy does not substantially change when the bulk resistivity is about $10^9$ Ω·cm or more. Further, as the bulk resistivity of the fuel supply pipe increases, the charging potential, which is generated by electrification of the fuel and the fuel supply pipe when fuel passes through the fuel supply pipe, increases (i.e. the amount of electric charge increases). The charging potential does not substantially change when the bulk resistivity is about $10^9$ Ω·cm or less.

From FIG. 3, the following facts can be understood.

When the bulk resistivity of the fuel supply pipe is low, the charging potential, which is generated by electrification of the fuel and the fuel supply pipe when fuel passes through the fuel supply pipe, is low (i.e. the amount of electric charge is small). However, because the discharge energy is high, the electric charge built up on the fuel supply pipe is rapidly discharged. Therefore, spark discharge may be generated on the fuel supply pipe. If spark discharge is generated on the fuel supply pipe, the fuel supply pipe may deteriorate.

On the other hand, when the bulk resistivity of the fuel supply pipe is high, the discharge energy is low. Therefore, the electric charge built up on the fuel supply pipe is not rapidly discharged. However, the charging potential, which is generated by electrification of the fuel and the fuel supply pipe when fuel passes through the fuel supply pipe, is high (i.e. the amount of electric charge is large). Therefore, when the fuel, which has passed through the fuel supply pipe, then passes through a metal fuel supply pipe, a larger amount of electric charge is inductively built up on the metal fuel supply pipe by the electric charge of the electrically charged fuel. Because the bulk resistivity of the metal fuel supply pipe is low, high discharge energy is generated when the electric charge built up on the metal fuel supply pipe is discharged. Therefore, spark discharge may be generated between the metal fuel supply pipe and the vehicle body or the operator. If spark discharge is generated on the metal fuel supply pipe, the metal fuel supply pipe may deteriorate and operations by the operator may be disturbed.

A mechanism that discharges electric charge built up on the fuel supply pipe, if provided, can prevent build-up of the electric charge on the fuel supply pipe and thus prevent generation of spark discharge on the fuel supply pipe. However, it is difficult to discharge the electric charge that builds up in the fuel when the fuel passes through the fuel supply pipe, without generating spark discharge, for example, on the metal fuel supply pipe that is disposed on the downstream side.

Therefore, in order to prevent spark discharge from being generated by the electric charge that is inductively built up on the metal fuel supply pipe, it is necessary to reduce the amount of electric charge that is inductively built up on the metal fuel supply pipe when the electrically charged fuel passes through the metal fuel supply pipe. Specifically, it is necessary to reduce the amount of electric charge that builds up in the fuel when the fuel passes through the fuel supply pipe that is disposed on the upstream side of the metal fuel supply pipe. To this end, the bulk resistivity of the fuel supply pipe should be chosen such that the amount of electric charge that builds up in the fuel when the fuel passes through the fuel supply pipe is reduced. By doing this, when the electric charge is inductively built up by the electric charge of the electrically charged fuel on the metal fuel supply pipe disposed on the downstream side of the fuel supply pipe and then this electric charge is discharged through the vehicle body or the operator, a spark discharge will not be generated. As a result of experiments, the inventors have found that the amount of electric charge of the fuel within the fuel supply pipe can be held low if the bulk resistivity of the fuel supply pipe is about $10^{11}$ Ω·cm or less. Thus, even if the metal fuel supply pipe is inductively charged by the electric charge of the electrically charged fuel, spark discharge is not readily generated when the inductively built-up electric charge is discharged.

Further, in order to prevent electric charge from building up on the fuel supply pipe, for example, a conductive member made of metal or a similar material may be mounted on the outer periphery of the fuel supply pipe and a ground wire may be connected between the conductive member and the vehicle body. Alternatively, the fuel supply pipe may be made of a conductive resin and a ground wire may be connected between the fuel supply pipe and the vehicle body.

However, the above-mentioned methods for preventing electric charge from building up on the fuel supply pipe require the conductive member to be mounted on the outer periphery of the fuel supply pipe and then a ground wire must be connected. Accordingly, costs are increased. Therefore, it is desired to provide a method that does not require such operations.

In order to eliminate the need to mount the conductive member on the outer periphery of the fuel supply pipe and to connect a ground wire, the electric charge should be prevented from being rapidly discharged when the electric charge built up on the fuel supply pipe is discharged, so that a spark discharge will not be readily generated on the fuel supply pipe. Specifically, the bulk resistivity of the fuel supply pipe should be chosen such that spark discharge is not generated when the electric charge built up on the fuel supply pipe is discharged. As a result of experiments, the inventors have found that if the bulk resistivity of the fuel supply pipe is about $10^7$ Ω·cm or more, spark discharge is not readily generated when the electric charge built up on the fuel supply pipe is discharged.

From the above findings, if the bulk resistivity of the fuel supply pipe is within the range from $10^7$ to $10^{11}$ Ω·cm, electric discharge energy, which is generated when the electric charge built up on the fuel supply pipe is discharged, can be held low to such an extent that generation of spark discharge can be minimized. At the same time, the amount of electric charge that builds up in the fuel and the fuel supply pipe when the fuel passes thorough the fuel supply pipe, can be held low. Consequently, the amount of electric charge that is inductively built up by the electric charge of the electrically charged fuel on the metal fuel supply pipe that is disposed on the downstream side of the fuel supply pipe, can be reduced. Thus, spark discharge can be prevented from being generated between the metal fuel supply pipe and the vehicle body or the operator.

The fuel supply pipe having the bulk resistivity of $10^7$ to $10^{11}$ Ω·cm can be made, for example, of a resin or rubber having the bulk resistivity of $10^7$ to $10^{11}$ Ω·cm.

The connecting fuel supply pipes may be made of a resin, rubber or various other materials that have the bulk resistivity of $10^{11}$ Ω·cm or less or within the range from $10^7$ to $10^{11}$ Ω·cm.

Although the above-described fuel supply pipe has a mono-layer structure, the fuel supply pipe may have a multi-layer structure. The multi-layer fuel supply pipe is suitably utilized when the fuel supply pipe is made of a resin that has a bulk resistivity of about $10^7$ to $10^{11}$ Ω·cm and fuel can readily penetrate the resin. For example, by providing a resin layer comprising a resin that has a bulk resistivity of about $10^7$ to $10^{11}$ Ω·cm, into which fuel readily penetrates, the amount of electric charge of the fuel and the fuel supply pipe can be held low. Further, by providing a resin layer (barrier layer) that has the bulk resistivity of either about $10^6$ Ω·cm or less or about $10^{12}$ Ω·cm or more, into which fuel does not readily penetrate, the fuel can be prevented from penetrating and leaking from the fuel supply pipe. A second embodiment of the present invention will now be explained.

A known multi-layer resin fuel supply pipe is disclosed, for example, in Japanese Laid-Open Patent Publication No. 6-72160. The known resin fuel supply pipe has an innermost layer made of a conductive resin so that the charging potential of the resin fuel supply pipe can be held low.

Figure 4:
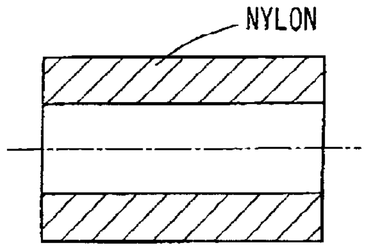
FIG. 4 is a view showing a mono-layer resin fluid supply pipe.
Figure 5:
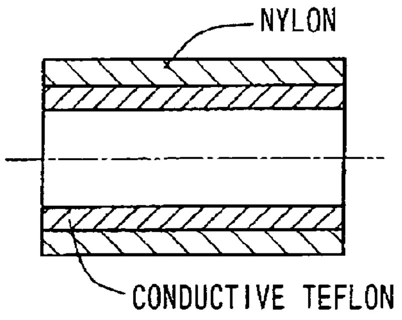
FIG. 5 is a view showing a known double-layer resin fluid supply pipe.
Figure 6:
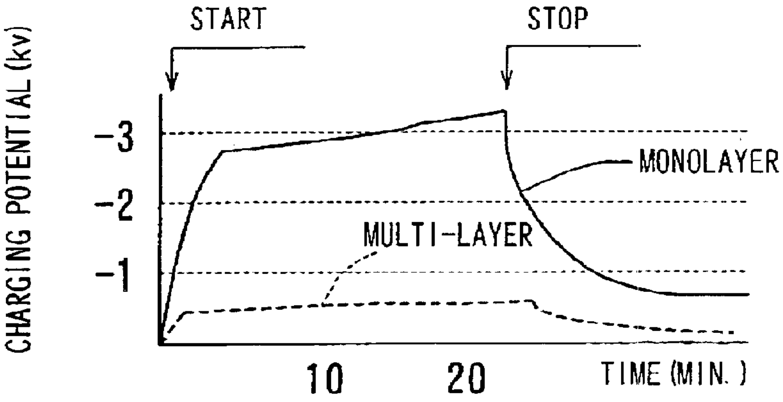
PRIOR ART FIG. 6
FIG. 6 is a graph showing the charging potential of the mono-layer resin fuel supply pipe and the double-layer resin fuel supply pipe.
Figure 7:
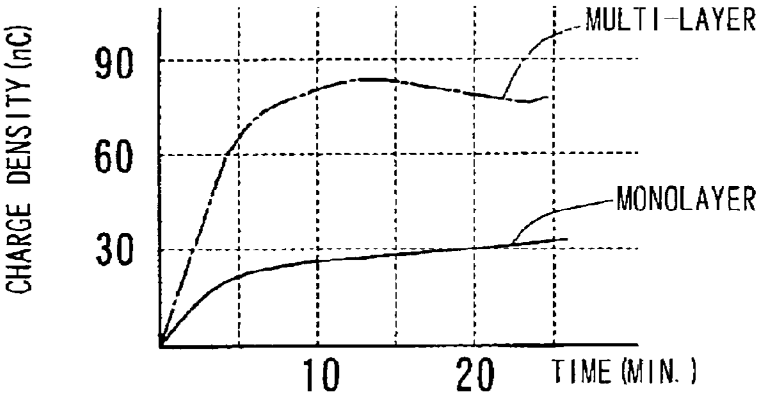
FIG. 7 is a graph showing the charge density of the fuel for the mono-layer resin fuel supply pipe and the double-layer resin fuel supply pipe.
Figure 8:
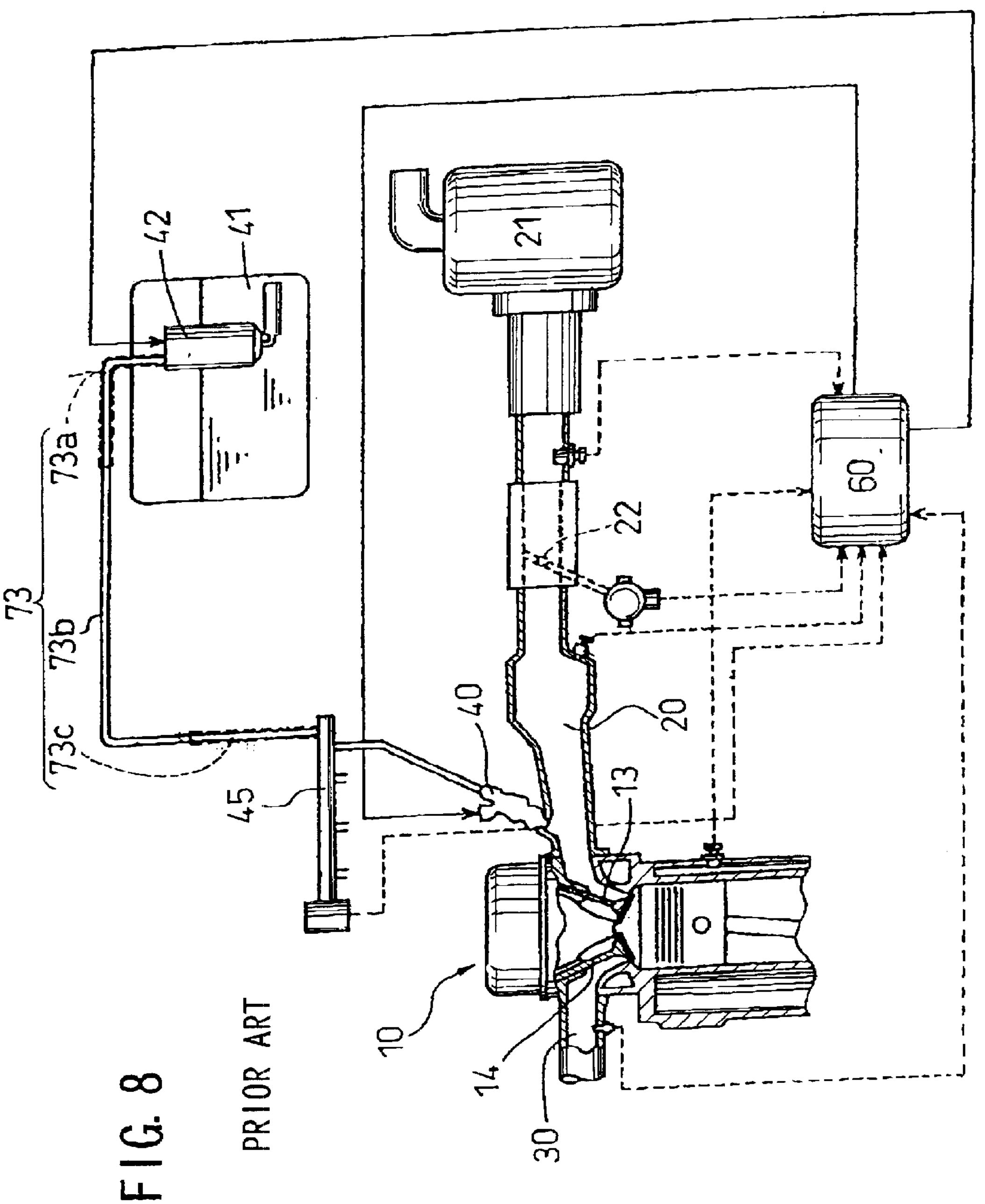
FIG. 8 PRIOR ART
FIG. 8 is a view schematically showing a construction of a fuel supply system using a known fluid supply pipe.

With respect to a mono-layer resin fuel supply pipe and a multi-layer resin fuel supply pipe that has an innermost layer made of a conductive resin, the inventors have measured the charging potential of the resin fluid supply pipes and the charge density (the amount of electric charge) of the fuel that has passed through the resin fluid supply pipes. The measurement results are shown in FIGS. 6 and 7. As shown in FIG. 4, an insulating resin layer made of nylon (hereinafter referred to as 'nylon layer') was used for this measurement as the mono-layer resin fuel supply pipe. Further, as shown in FIG. 5, a resin fuel supply pipe having a double-layer structure, which includes an inner layer comprising a conductive resin layer made of conductive Teflon (hereinafter referred to as 'conductive Teflon layer') and an outer layer comprising a nylon layer, was used as the multi-layer resin fuel supply pipe.

As shown in FIG. 6, the multi-layer resin fuel supply pipe, which includes an inner layer made of conductive Teflon, has a lower charging potential than the mono-layer resin fuel supply pipe. However, as shown in FIG. 7, the multi-layer resin fuel supply pipe has a higher charge density for fuel that has passed through the resin fuel supply pipe than the mono-layer resin fuel supply pipe.

The inventors believe that this result is caused by the following reasons.

Specifically, Teflon has a bulk resistivity of about $10^{16}$ Ω·cm. Thus, as shown in FIG. 3, the charging potential (the amount of electric charge) is higher when the fuel has passed through the multi-layer resin fuel supply pipe that includes an inner layer made of conductive Teflon, compared with when the fuel has passed through the mono-layer resin fuel supply pipe. Further, the electric charge built up on the conductive Teflon layer tries to move to the outer nylon layer and to the fuel that is inside. However, only a small amount of electric charge moves to the nylon layer, while a large amount of electric charge moves to the fuel. Therefore, in the multi-layer resin fuel supply pipe that includes an inner layer made of conductive Teflon, the charge density of the fuel is higher and the charging potential is lower compared with the mono-layer resin fuel supply pipe.

Thus, in the multi-layer resin fuel supply pipe that includes an inner layer made of a conductive resin, because the charge density of the fuel that has passed through the resin fuel supply pipe is higher, a larger amount of electric charge is inductively built up by the electric charge of the electrically charged fuel on components that are disposed on the downstream side of the fuel supply pipe.

Further, if an electrically charged conductor is disposed in close contact with a thin insulating element, when a grounding conductor is brought near the surface of the insulating element, creeping discharge will be generated on the surface of the insulating element by the electric charge built up on the conductor. In the multi-layer resin fuel supply pipe that includes an inner layer made of conductive Teflon as shown in FIG. 5, the inner peripheral surface of the nylon layer closely contacts the outer peripheral surface of the conductive Teflon layer. Therefore, creeping discharge may be generated on the outer peripheral surface of the nylon layer. Because the discharge energy of creeping discharge is high, if creeping discharge is generated, the resin fuel supply pipe may deteriorate.

Therefore, this embodiment provides a multi-layer fuel supply pipe in which the amount of electric charge that builds up in the fuel can be maintained within a proper range. Further, this embodiment provides a multi-layer fuel supply pipe in which the charging potential of the fuel supply pipe can be held low and in which creeping discharge can be prevented from being generated on the surface of the fuel supply pipe.

Figure 9:
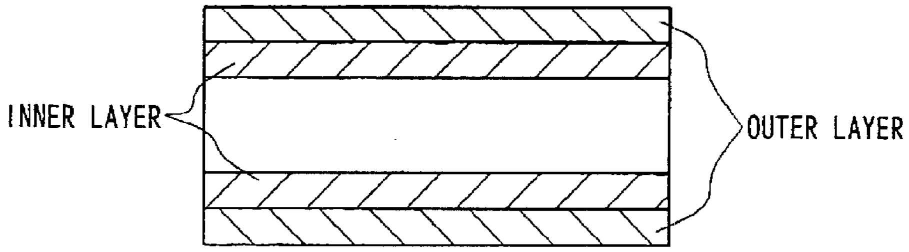
FIG. 9 shows a fuel supply pipe according to a second embodiment of the invention.

First, an example of the fuel supply pipe will be described in which a double-layer resin fuel supply pipe that includes a resin inner layer and a resin outer layer as shown in FIG. 9 is used as connecting fuel supply pipes 43*a*, 43*c* shown in FIGS. 1 and 2.

The bulk resistivity of the inner resin layer is chosen to be within the range from about $10^7$ to $10^{11}$ Ω·cm. By doing this, the above-mentioned effects can be obtained. Specifically, by choosing the bulk resistivity to be about $10^{11}$ Ω·cm or less, the amount of electric charge that builds up, for example, on the inner resin layer and the fuel when the fuel passes through the resin fuel supply pipe 43*a* shown in FIG. 2 can be held low. As a result, even when the metal fixed fuel supply pipe 43*b* that is disposed on the downstream side is inductively charged by the electric charge of the electrically charged fuel, a spark discharge is not readily generated. Further, by choosing the bulk resistivity of the inner resin layer to be $10^7$ Ω·cm or more, creeping discharge can be prevented from being generated on the surface of the outer resin layer. If the bulk resistivity of the inner resin layer is $10^6$ Ω·cm or less, creeping discharge may be generated on the outer peripheral surface of the outer resin layer.

Further, the bulk resistivity of the outer resin layer is chosen to be about $10^{12}$ Ω·cm or more. When the bulk resistivity of the outer resin layer is chosen to be higher than the bulk resistivity of the inner resin layer, the electric charge of the inner resin layer cannot readily move to the outer resin layer. Therefore, the electric charge does not readily build up on the outer resin layer. Further, when the bulk resistivity of the outer resin layer is about $10^{12}$ Ω·cm or more, the discharge energy is low enough so that the electric charge built up on the outer resin layer is not rapidly discharged. Thus, generation of spark discharge on the outer resin layer can be reliably prevented. Further, because the outer resin layer does not directly contact the fuel, the charging potential (the amount of electric charge) built up by friction between the outer resin layer and the fuel need not be considered, and only the discharge energy should be considered. Thus, the resin fuel supply pipe may possess the favorable characteristics of the inner resin layer and the favorable characteristics of the outer resin layer. For example, if a resin is used, in which the fuel readily penetrates, as the resin that forms the inner resin layer, a resin that the fuel does not readily penetrate will be used as the outer resin layer. In this case, the outer resin layer serves as a barrier layer. Therefore, even if the inner resin layer is made of a resin that the fuel readily penetrates, the fuel will not leak out of the resin fuel supply pipe.

Figure 10:
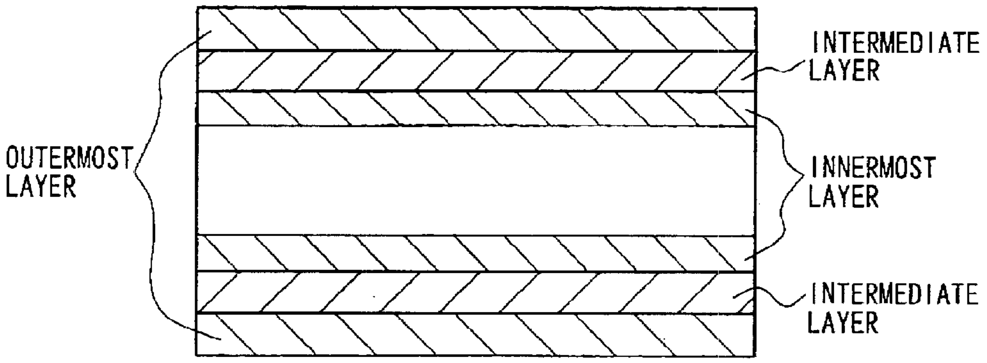
FIG. 10 shows a fuel supply pipe according to a third embodiment of the invention.

The resin fuel supply pipe may have three or more layers as shown in FIG. 10. In such a case, the bulk resistivity of the innermost layer is chosen to be about $10^7$ to $10^{11}$ Ω·cm, and the bulk resistivity of the outermost layer is chosen to be about $10^{12}$ Ω·cm or more. An intermediate layer between the innermost layer and the outermost layer can be made of various resins for which the bulk resistivity is not limited. For example, the intermediate layer can be made of a resin that the fuel does not readily penetrate. In this case, because the bulk resistivity of the intermediate layer is not limited, the intermediate layer can be made of a resin selected from various resins. Such a resin fuel supply pipe having three or more layers also has the same effect as the above-mentioned double-layer resin fuel supply pipe.

Although in the above embodiment each layer has been described as being made of a resin, each layer may also be made of a material other than a resin, such as rubber. For example, if the innermost layer is made of a rubber that has a bulk resistivity of about $10^7$ to $10^{11}$ Ω·cm, a response delay will be caused when the fuel pressure is adjusted, but it is effective to reduce the amount of electric charge that builds up on the fuel and to prevent the generation of a spark discharge when the electric charge built up on the fuel supply pipe is discharged. If the outermost layer is made of a rubber that has a bulk resistivity of about $10^{12}$ Ω·cm or more, its function as a barrier layer is not as strong as an outermost layer made of a resin, but it is effective to reduce the amount of electric charge that builds up on the fuel and to prevent the generation of a spark discharge when the electric charge built up on the fuel supply pipe is discharged.

The present invention is not limited to the constructions that have been described as the representative embodiments, but rather, may be added to, changed, replaced with alternatives or otherwise modified without departing from the spirit and scope of the invention.

For example, while fuel supply pipe 43 has been described as comprising metal fixed fuel supply pipe 43*b* and resin connecting fuel supply pipes 43*a*, 43*c*, fuel supply pipe 43 may also comprise only resin fuel supply pipes. In this case, by using a resin fuel supply pipe that has a bulk resistivity of about $10^{11}$ Ω·cm or less, the amount of electric charge that builds up in the fuel when the fuel passes through the resin fuel supply pipe can be maintained within a proper range. Consequently, the amount of electric charge that is inductively built up by the electric charge of the electrically charged fuel on a conductive member disposed on the downstream side of the resin fuel supply pipe, can be reduced. Thus, spark discharge can be prevented from being generated on the conductive member. If the resin fuel supply pipe has a bulk resistivity of $10^7$ to $10^{11}$ Ω·cm, not only the amount of electric charge that builds up on the fuel when the fuel passes through the resin fuel supply pipe can be maintained within a proper range, but also spark discharge can be prevented from being generated when the electric charge built up on the resin fuel supply pipe is discharged. If a conductive member is not provided on the downstream side of the resin fuel supply pipe, it should only be considered to prevent spark discharge from being generated on the resin fuel supply pipe. Therefore, a resin fuel supply pipe having a bulk resistivity of $10^7$Ω·cm or more can be used.

Further, although connecting fuel supply pipes 43*a*, 43*c*, which are connected to fixed fuel supply pipe 43*b* on the side of the fuel pump and on the side of the internal combustion engine, have been described as being made of a resin, only the connecting fuel supply pipe 43*a* may be made of a resin in order to reduce the amount of electric charge that is inductively built up on fixed fuel supply pipe 43*b*. In this case, the bulk resistivity of connecting fuel supply pipe 43*a* is chosen to be about $10^{11}$ Ω·cm or less or within the range from $10^7$ to $10^{11}$ Ω·cm. In this case, the amount of electric charge that is inductively built up on fixed fuel supply pipe 43*b* by the electric charge of the fuel that has been electrically charged within connecting fuel supply pipe 43*a*, can be reduced. Thus, generation of spark discharge on fixed fuel supply pipe 43*b* can be minimized.

Alternatively, connecting fuel supply pipes 43*a*, 43*c* may be made of a material other than a resin, such as rubber, of which the bulk resistivity is about $10^{11}$ Ω·cm or less or within the range from $10^7$ to $10^{11}$ Ω·cm.

Although the fluid supply pipe of the present invention has been described that is utilized in a fuel supply system for an internal combustion engine in which a fuel pump controls the fuel pressure, it can be also utilized in various other types of fuel supply systems for internal combustion engines. Further, the fluid supply pipe of the present invention can be also utilized in fuel supply systems for various kinds of combustion engines other than internal combustion engines. Further, the fluid supply pipe of the present invention can be also utilized in fluid supply systems for supplying various kinds of liquids or gases other than fuel.

What is claimed is:

1. A fluid supply pipe adapted to communicate a fluid from one end of the pipe to an opposite end thereof, the fluid supply pipe having at least an innermost layer and a second layer surrounding the innermost layer, the innermost layer being adapted to contact the fluid, and the second layer surrounding the innermost layer;

wherein the innermost layer has a bulk resistivity of about $10^7$ to $10^{11}$ Ω·cm and wherein the second layer has a bulk resistivity of at least about $10^{12}$ Ω·cm.

2. A fluid supply pipe as defined in claim 1, wherein the innermost layer comprises a resin.

3. A fluid supply pipe as defined in claim 1, wherein the second layer comprises a resin.

4. A fluid supply pipe as defined in claim 1, wherein the innermost layer and the second layer comprise a resin.

5. A fluid supply pipe 1, further including a third layer surrounding the second layer, wherein the third layer has a bulk resistivity of at least about $10^{12}$ Ω·cm.

6. A fluid supply pipe as defined in claim 5, wherein the third layer comprises a resin.

7. A fluid supply pipe as defined in claim 5, wherein the second layer, the third layer or both the second layer and the third layer comprises a resin, into which the fluid cannot readily penetrate, and the second layer, the third layer or both the second layer and the third layer serves as a fluid barrier layer.

8. A fluid supply pipe as defined in claim 5, wherein the innermost layer, the second layer and the third layer comprise a resin.

9. A fluid supply pipe adapted to supply fuel from a fuel tank to a combustion engine, comprising:

a first supply pipe adapted to communicate a fluid from one end to an opposite end, the first supply pipe having an innermost layer and a second layer surrounding the innermost layer, the innermost layer contacting the fuel and comprising a material having a bulk resistivity between about $10^7$ to $10^{11}$ Ω·cm, and the second layer having a bulk resistivity of at least about $10^{12}$ Ω·cm and a second supply pipe adapted to communicate a fuel from one end to an opposite end, the second supply pipe comprising a metal, wherein the first supply pipe is disposed between the fuel tank and the second supply pipe.

10. A fuel supply system as defined in claim 9, further including a third layer surrounding the second layer of the first supply pipe, wherein the third layer has a bulk resistivity of at least $10^{12}$ Ω·cm.

11. A fuel supply system as defined in claim 10, wherein the bulk resistivity of the innermost layer, the second layer and the third layer comprises a resin.

* * * * *